US012574678B2

(12) United States Patent
Dyreby

(10) Patent No.: US 12,574,678 B2
(45) Date of Patent: Mar. 10, 2026

(54) METHOD AND SYSTEM FOR MANAGING THE LOW FREQUENCY CONTENT IN A LOUDSPEAKER SYSTEM

(71) Applicant: BANG & OLUFSEN A/S, Struer (DK)

(72) Inventor: Jakob Dyreby, Struer (DK)

(73) Assignee: Bang & Olufsen A/S, Struer (DK)

( * ) Notice: Subject to any disclaimer, the term of this patent is extended or adjusted under 35 U.S.C. 154(b) by 188 days.

(21) Appl. No.: 18/366,453

(22) Filed: Aug. 7, 2023

(65) Prior Publication Data

US 2024/0056724 A1 Feb. 15, 2024

(30) Foreign Application Priority Data

Aug. 11, 2022 (EP) .................................... 22020385

(51) Int. Cl.
*H04R 1/26* (2006.01)

(52) U.S. Cl.
CPC ...................................... *H04R 1/26* (2013.01)

(58) Field of Classification Search
CPC . H04R 1/26; H04S 7/302; H04S 7/307; H04S 2400/07
See application file for complete search history.

(56) References Cited

U.S. PATENT DOCUMENTS 6,760,451 B1 7/2004 Craven et al.
2007/0025559 A1 2/2007 Mihelich et al.
2009/0304213 A1* 12/2009 Cook .......................... H04S 1/002 381/300
2011/0150241 A1 6/2011 Christoph et al.
2020/0068332 A1 2/2020 Goldberg et al.

OTHER PUBLICATIONS

Extended European Search Report issued Jan. 30, 2023 for European Patent Application No. 22020385.5, 10 pages.
EPO Office Action dated Nov. 19, 2025 issued in EP Application No. 22 020 385.5 (9 pages).

* cited by examiner

*Primary Examiner* — James K Mooney
(74) *Attorney, Agent, or Firm* — Thomas E. Williams; Crowell & Moring LLP

(57) ABSTRACT

The present invention relates to a method for managing the low frequency content obtained by a loudspeaker system comprising a plurality of loudspeaker devices, such as a surround sound loudspeaker system, wherein each individual loudspeaker device has a known response as a function of frequency under anechoic conditions comprising a phase response, the method comprising the steps of providing a plurality of loudspeaker devices (1, 2, 3, 4) and for each of said plurality of loudspeaker devices (1, 2, 3, 4) providing the corresponding phase response as a function of frequency obtained under anechoic conditions and for each of the individual loudspeaker devices (1, 2, 3, 4) inserting a filter device (5, 6, 7, 8) in the signal chain to the corresponding loudspeaker device (1, 2, 3, 4), where the individual filter device (5, 6, 7, 8) is configured such that the resulting phase response of each individual loudspeaker device (1, 2, 3, 4) under anechoic conditions is substantially the same for all of the loudspeaker devices (1, 2, 3, 4). The invention further relates to a loudspeaker system implementing the method of the invention.

13 Claims, 6 Drawing Sheets

METHOD AND SYSTEM FOR MANAGING THE LOW FREQUENCY CONTENT IN A LOUDSPEAKER SYSTEM

CROSS-REFERENCE TO RELATED APPLICATIONS

This application claims priority to European Patent Application No. 22020385.5, filed on Aug. 11, 2022. This application is incorporated by reference herein in its entirety.

TECHNICAL FIELD

The present invention relates to a method for managing the low frequency content in a loudspeaker system, such as a surround sound setup, consisting of multiple different loudspeakers, each with known response characteristics. Specifically, the invention relates to methods for maximizing bass sound pressure output and for improving bass precision over the entire low-frequency band. The present invention further relates to a system of loudspeakers that apply the method of the invention.

BACKGROUND OF THE INVENTION

Reproduction of powerful low frequency sounds is traditionally technically demanding as it requires that large volumes of air be brought to oscillate at the required low frequencies. One solution is to use specially designed low-frequency loudspeaker units, so called woofers or subwoofers, that can move a large quantity of air either due to a large loudspeaker diaphragm area or to large diaphragm excursions. Another solution is to use a plurality of loudspeaker units having comparatively smaller diaphragm areas and/or more limited maximum diaphragm excursions, whereby the loudspeakers' radiations can reinforce each other in the low frequency region.

If a plurality of loudspeaker units is used, the normal solution is to use only identical loudspeakers to reproduce the bass region. In this way it is only in the cross-over frequency range between the low frequencies and the mid frequencies that the loudspeakers used to cover the low frequency region may cancel out loudspeaker units used to cover the mid frequency region.

In a multi-loudspeaker set-up, a disadvantage of this approach is that only the bass capability of some of the loudspeakers, i.e., the low frequency loudspeaker units, is used. However, in the cross-over region between the low and mid frequencies, not only the low frequency loudspeaker units are able to reproduce the low frequency sound components. The mid-frequency loudspeaker units are also able to reproduce frequencies in this region.

On this background there is a need for a loudspeaker system and method that will enable the low frequency loudspeaker units and the mid frequency loudspeaker units to cooperate in the crossover region between low and mid frequencies without the radiation from the low frequency loudspeaker units cancelling out the radiation from the mid frequency loudspeaker units and thereby leading to a frequency response with undesired notches in the frequency response in the crossover region.

OBJECTS OF THE INVENTION

It is the object of the invention to solve or at least reduce the following problems with the prior art methods and systems.

When combining multiple loudspeakers into a system the resulting response in the listening position will be the sum of the contributions from each individual loudspeaker. When N loudspeakers are identical and the distances from each speaker to the listening position are the same, the speaker responses will add up in phase and the resulting sound pressure will be N times higher, at least under anechoic conditions.

However, if the loudspeakers have different phase responses or have different distances to the listening position, a situation may occur that the responses from the individual speakers cancel out at some frequencies. This will result in a loss of sound pressure level and an uneven resulting frequency response of the system as a whole.

DISCLOSURE OF THE INVENTION

The above and further objects and advantages are obtained with a method and corresponding system according to the present invention. Specifically, the invention solves the issue of different phase responses when combining different loudspeakers using knowledge about each specific loudspeaker type involved.

The proposed solution uses knowledge about the loudspeakers which are part of the system to prefilter their input signals such that the resulting frequency response in the listening position is more even. Each loudspeaker input signal is filtered by an all-pass filter such that the resulting phase response of each loudspeaker is identical. Further, the level of bass directed to each loudspeaker is determined by its individual bass capability. Hereby, all loudspeakers may be used to their maximum bass capability while the system is acting linearly to the highest possible sound pressure level.

The knowledge about the phase and amplitude characteristics of the different individual loudspeakers in the system is available from a database containing data of all known and supported loudspeakers. This database may be stored in the sound processing unit of the system and/or may be available on-line through a wireless or wired internet link. When new loudspeakers become commercially available, the database will be updated with the characteristics of the new loudspeaker, allowing for it to be used in the actual setup.

During the set-up process of the sound system, the connected loudspeakers will be identified, either by manual selection from a list of supported loudspeakers or automatically by communication (wired or wirelessly) between the loudspeaker and the sound processing unit of the system.

According to a first aspect of the present invention there is provided a method for managing the low frequency content obtained by a loudspeaker system comprising a plurality of loudspeaker devices, such as a surround sound loudspeaker system, wherein each individual loudspeaker device has a known response as a function of frequency under anechoic conditions comprising a phase response, the method comprising the steps of:

- providing a plurality of loudspeaker devices;
- for each of said plurality of loudspeaker devices providing the corresponding phase response as a function of frequency obtained under anechoic conditions;
- for each of the individual loudspeaker devices inserting a filter device in the signal chain from the respective input to the corresponding loudspeaker device, where the individual filter device is configured such that the resulting phase response of each individual loudspeaker device under anechoic conditions is substantially the same for all of the loudspeaker devices.

In an embodiment of the first aspect, the method comprises the additional steps of:

- determining the distances from a given listening point to each individual loudspeaker device;
- if the loudspeaker devices are located at different distances from the given listening point, introducing an additional individual linear phase compensation (delay) in the respective signal chains to compensate for these different distances.

In an embodiment of the first aspect, the additional individual phase compensation is zero for the loudspeaker device that is at the greatest distance from the listening point, such that the sound signals emitted by the remaining loudspeaker devices are delayed corresponding to the difference between the distance between the loudspeaker device at the greatest distance from the listening point and the respective distances between each individual of the remaining loudspeaker devices from the listening point.

In an embodiment of the first aspect, the filter devices are all-pass filters.

In an embodiment of the first aspect, the filter devices are II R filters.

In an embodiment of the first aspect, the individual filter devices have a passband that is limited to the low-frequency region, preferably below 1000 Hz, more preferably below 500 Hz.

In an embodiment of the first aspect, the method comprises providing a database containing the filter coefficients or filter parameters or the corresponding magnitude and phase response of the loudspeaker devices measured anechoically for each of a plurality of loudspeaker devices.

In an embodiment of the first aspect, the database is accessible via the internet or other communication networks, which may be wired or wireless.

According to a second aspect of the present invention there is provided a loudspeaker system comprising a plurality of loudspeakers devices, such as a surround sound loudspeaker system, wherein each individual loudspeaker device has a known response as a function of frequency under anechoic conditions, comprising a phase response, where the system comprises:

- a plurality of loudspeaker devices;
- for each of the loudspeaker devices a filter device capable of providing phase compensation of the input signal for each specific loudspeaker device and providing a filtered output signal either directly or via further signal processing means, such as filters, equalizers or amplifiers, to the specific loudspeaker device;
- means for providing information about the necessary phase compensation of the input signal for each specific loudspeaker device;
- means for adjusting the phase response of each filter according to the above-mentioned information.

In an embodiment of the second aspect, the means for providing information about the necessary phase compensation is a database provided in the system.

In an embodiment of the second aspect, the means for providing information about the necessary phase compensation is one or more remotely located databases and the system is provided with communication means configured to obtain information about the necessary phase compensation from the one or more remotely located databases.

In an embodiment of the second aspect, the filters are all-pass filters.

In an embodiment of the second aspect, the filters are IIR filters.

In an embodiment of the second aspect, the individual filter devices have a passband that is limited to the low-frequency region, preferably below 1000 Hz, more preferably below 500 Hz.

In an embodiment of the second aspect, the filter devices comprise a first filter unit configured to compensate for differences in phase response of the different loudspeaker devices under anechoic conditions and a second filter unit configured to compensate for said differences in the distances between the individual loudspeaker devices and the given listening point.

The advantage of the invention is that the resulting frequency response of the system of loudspeakers in a room becomes more even both in magnitude and phase. Further, the invention makes it possible to utilize the full bass performance of all loudspeakers in the system simultaneously, which increases the system's capability in terms of sound pressure level in the low-frequency range to its maximum.

Thus, the overall advantage of the invention is that various loudspeakers may be integrated better into a total system.

BRIEF DESCRIPTION OF THE DRAWINGS

Further benefits and advantages of the present invention will become apparent after reading the detailed description of non-limiting exemplary embodiments of the invention in conjunction with the accompanying drawings, wherein.

DETAILED DESCRIPTION OF THE INVENTION

Figure 1A:
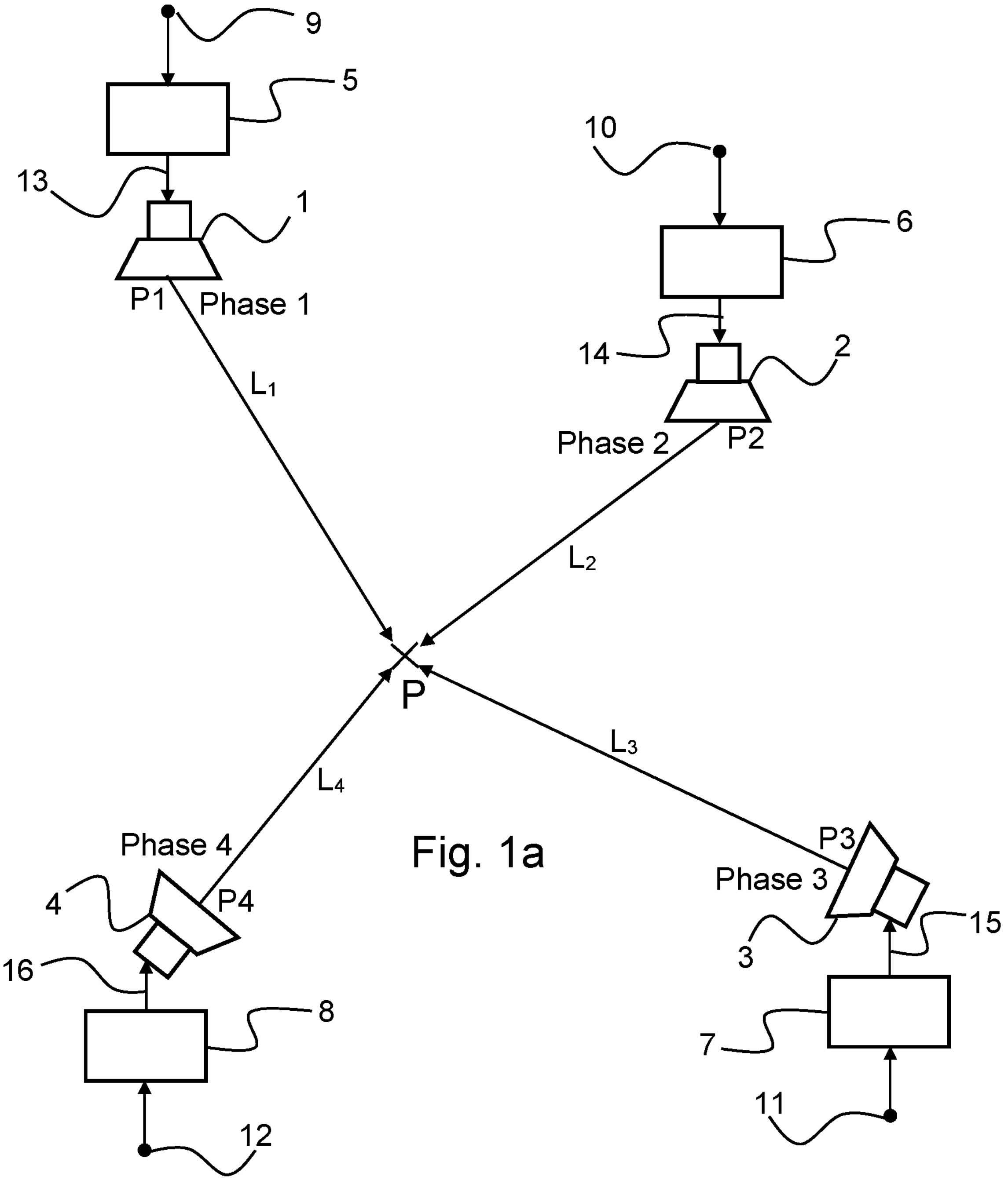
FIG. 1*a* shows a schematical block diagram of a system used to implement the method according to the invention.

With reference to FIG. 1*a* there is shown a non-limiting example of a set-up of loudspeaker devices in a listening room comprising a preferred listening point P (sometimes referred to as the "sweet spot") at which a listener expects to obtain the best possible sound quality provided by this 30 set-up of loudspeaker devices. The set-up shown in FIG. 1*a* comprises four loudspeaker devices 1, 2, 3, 4 placed at locations P1, P2, P3, P4 at distances $L_1$, $L_2$, $L_3$, $L_4$ respectively from the listening point P.

The loudspeaker devices 1, 2, 3, 4 have different phase characteristics Phase1, Phase2, Phase3, Phase 4 respectively, measured under standard conditions in an anechoic room.

In the signal path from each of the respective input terminals 9, 10, 11, 12 to the corresponding loudspeaker device 1, 2, 3, 4 there is inserted a phase correcting filter device, 5, 6, 7, 8 by means of which the acoustic output signals provided by the individual loudspeaker devices can be corrected (equalized).

In the exemplary set-up shown in FIG. 1*a*, the loudspeaker devices are placed at different distances $L_1$, $L_2$, $L_3$, $L_4$ from the listening point P and these differences lead to corresponding frequency-dependent phase differences between the signals arriving at the listening point P from each individual loudspeaker device. Thus, the total phase difference of the signals from each individual loudspeaker at the listening point P will consist of the differences between the individual phase characteristics of the individual loudspeakers (measured under standard conditions in an anechoic room as mentioned above) and the phase differences caused by the propagation of the sound waves over the different distances from the respective loudspeaker devices to the listening point P. In a special case, where all of these distances are the same, there will of course be no phase differences caused by the sound traveling from the individual loudspeaker devices to the listening point P, and hence no corrections for such differences will have to be made.

Figure 1B:
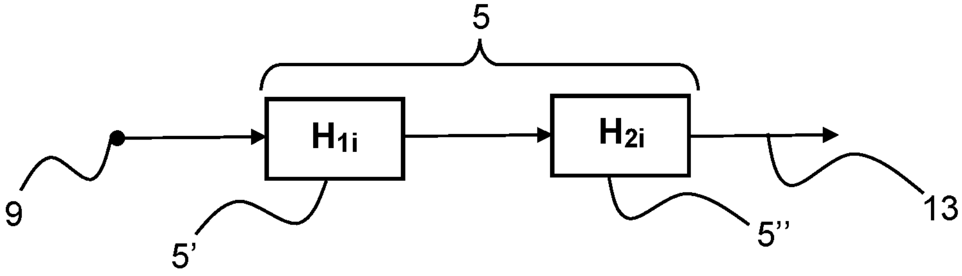
FIG. 1*b* shows a possible configuration of a filter device for use in the present invention comprising first and second filter units.

The individual phase correcting filter devices 5, 6, 7, 8 can be configured in many different ways. One possible configuration would be as shown in FIG. 1*b*, wherein each of the individual filter devices 5, 6, 7, 8 comprises a series connection of a first filter unit 5', 6', 7', 8' configured to compensate for differences in phase response of the different loudspeaker devices 1, 2, 3, 4 under anechoic conditions and a second filter unit 5", 6", 7", 8" configured to compensate for the differences in the distances $L_1$, $L_2$, $L_3$, $L_4$ between the individual loudspeaker devices and the given listening point P. The transfer functions of these two filters are H1*i* and H2*i* respectively. It should however be understood that the configuration shown in FIG. 1*b* merely constitutes a simple, non-limiting configuration of a correcting filter device that can be used in the present invention.

When using multiple loudspeakers in the same frequency range to play back correlated signals, the phase response of each loudspeaker has an influence on the resulting response. This is illustrated by a non-limiting example with reference to FIGS. 2 through 6. In FIGS. 2 through 6 two different loudspeaker devices (a subwoofer and a lowpass-filtered full band loudspeaker) are placed at the same distance from the listening point P.

Figure 2:
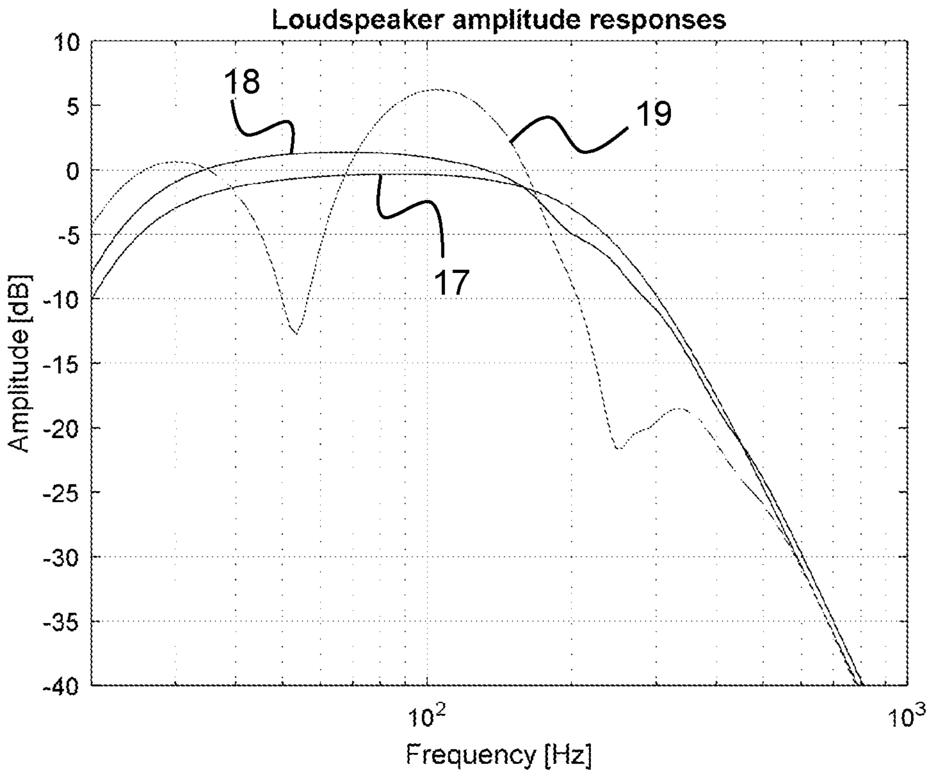
FIG. 2 shows the magnitude response as a function of frequency for a subwoofer device, a full band loudspeaker device with a lowpass filter inserted before the input terminals of the loudspeaker device and the resulting (summed) magnitude response of the two devices measured at a given position relative to the devices.

With reference to FIG. 2 there is shown as a non-limiting example the frequency response 17 of a subwoofer, the frequency response 18 of a lowpass filtered full band loudspeaker, and the resulting summed frequency response 19 of the two loudspeaker devices in an anechoic space in a listening position at the same distance from each of the loudspeakers.

Even though the individual responses of each loudspeaker are well controlled, the summed frequency response is very uneven. Further, at certain frequencies, the resulting level is decreased by using two loudspeakers rather than one. The reason for this is that the phase responses of the two loudspeaker devices are not aligned.

Figure 3:
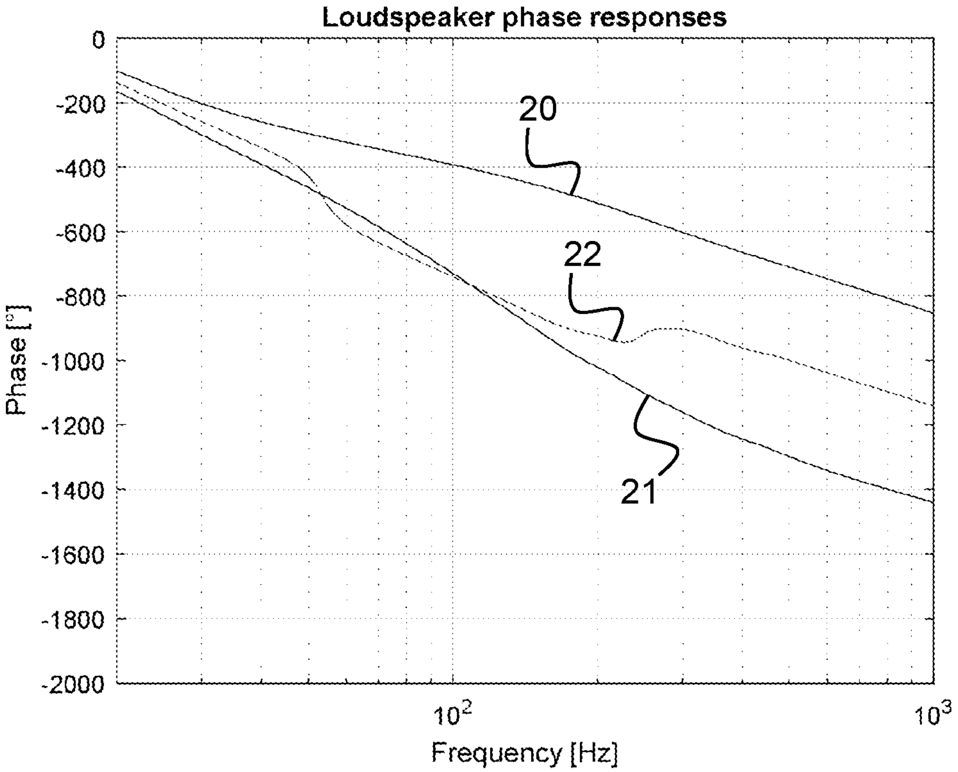
FIG. 3 shows the phase responses corresponding to the three magnitude responses shown in FIG. 1.

With reference to FIG. 3 there are shown the phase responses of each of the two loudspeaker devices. The phase response of the subwoofer is indicated by 20, the phase response of the lowpass filtered full band loudspeaker device is indicated by 21 and the summed phase response is indicated by 22.

The phase responses of each loudspeaker device are clearly different, and the result is that the resulting amplitude response becomes uneven as shown by 19 in FIG. 2. Additionally, the resulting phase response 22 becomes irregular.

In order to make the resulting phase and amplitude response more even, all-pass phase correction filters are inserted between each signal input and each individual loudspeaker device. The all-pass filters are in this embodiment of the method according to the invention designed as IIR filters with a common phase target for each loudspeaker device.

Figure 4:
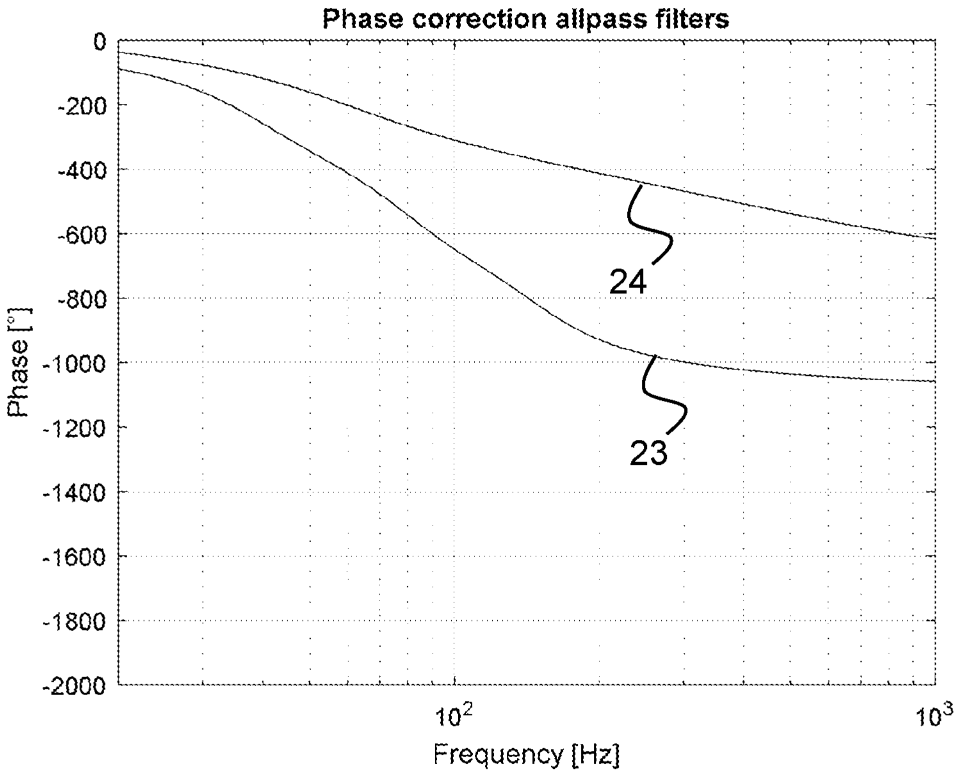
FIG. 4 shows an example of all-pass filter phase responses used to correct the respective phase responses shown in FIG. 3 of the subwoofer device and the full band, LP filtered loudspeaker device.

With reference to FIG. 4 there is shown an example of all-pass filter phase responses 23, 24 used to correct the respective phase responses shown in FIG. 3 of the subwoofer device and the full band, LP filtered loudspeaker device. Response 23 is for the subwoofer and response 24 is for the full band loudspeaker device.

The filters can be implemented as IIR all-pass filters which implies that the filters have a flat magnitude response.

Figure 5:
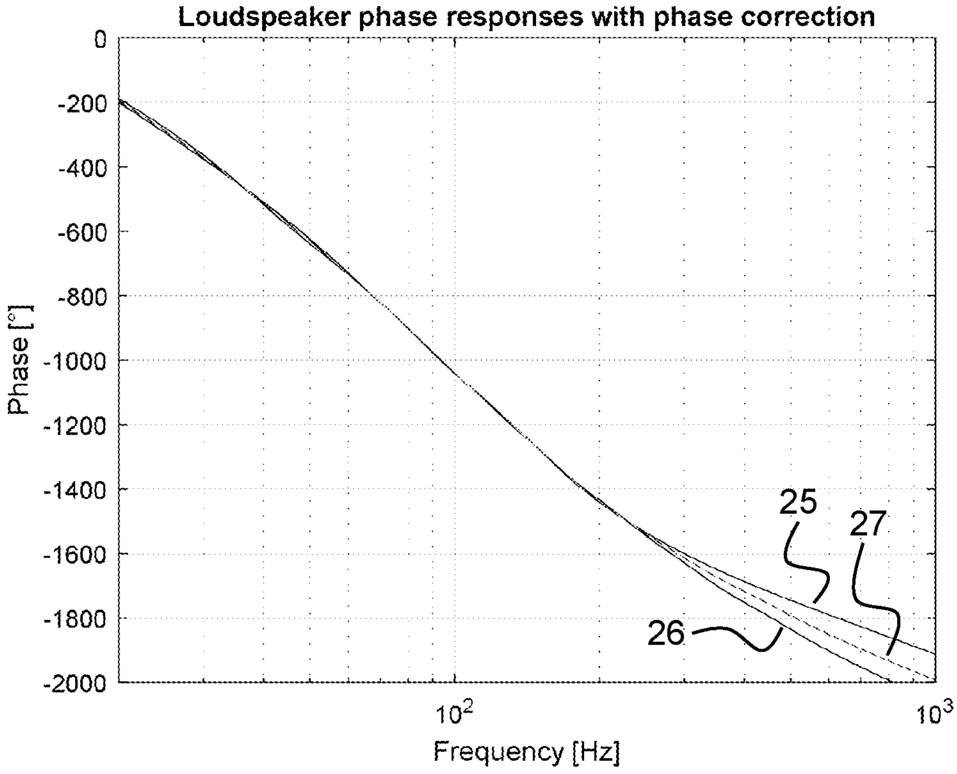
FIG. 5 shows the resulting phase responses with the phase corrections shown in FIG. 4 for the subwoofer device, the full band, LP filtered loudspeaker device and for the resulting (summed) response.

With reference to FIG. 5 there are shown the phase responses of the individual loudspeaker devices including the phase correction filters. Response 25 is for the subwoofer, response 26 is for the full band loudspeaker device and response 27 is the summed response.

Applying the phase correction all-pass filters makes the phase responses of the two loudspeaker devices similar and therefore also the summed phase response is the same.

Figure 6:
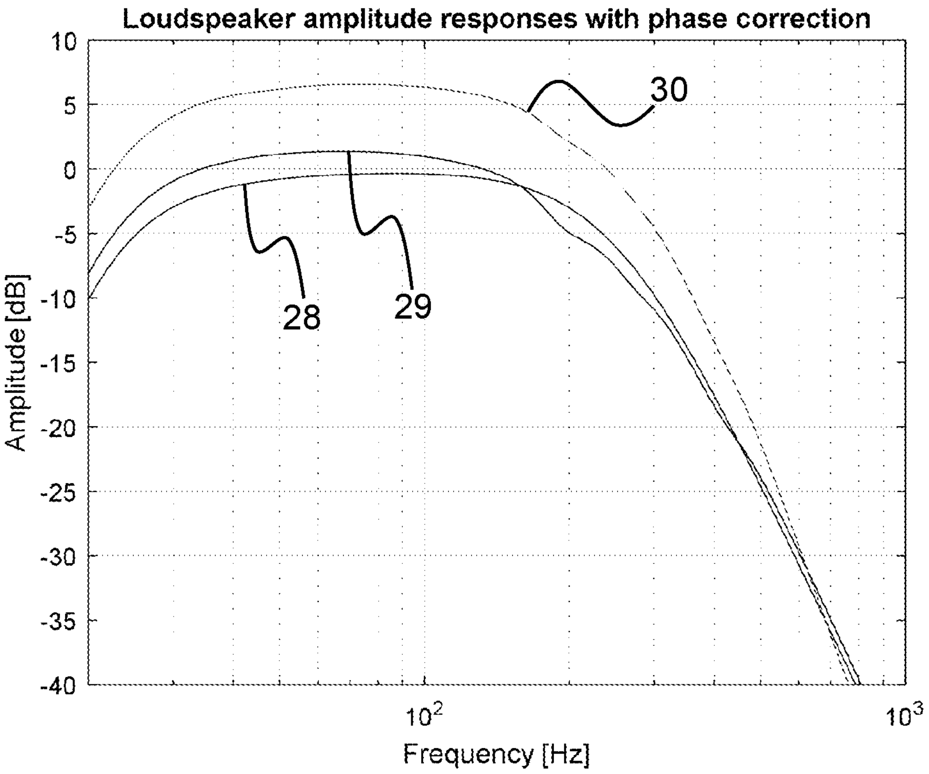
FIG. 6 shows the loudspeaker magnitude (amplitude) responses with phase correction for the subwoofer device, the full band, LP filtered loudspeaker device and the resulting (summed) combination of the two devices.

With reference to FIG. 6 there are shown the amplitude responses of the loudspeaker devices with the phase correction filters inserted in the signals path to the respective loudspeaker device, again in an anechoic space and at a listening position at equal distance from the individual loudspeakers. Reference numeral 28 indicates the amplitude response of the subwoofer, 29 indicates the amplitude response for the lowpass filtered full band loudspeaker device and 30 indicates the summed amplitude responses of the subwoofer and the full band loudspeaker device.

It is observed that the individual loudspeaker amplitude responses are not affected whereas the summed amplitude response is much more even and has increased in level at all frequencies compared with the amplitude response with reference numeral 19 in FIG. 2.

The introduction of IIR all-pass filters in the signal chain will of course introduce a larger phase shift of the resulting response relative to the input, which is also apparent in previous phase plots. To overcome this problem a FIR phase equalization filter may be introduced to the global bass signal.

If the loudspeaker devices 1, 2, 3, 4 are placed at different distances from the listening point P it is required to know the distances $L_1$, $L_2$, $L_3$, $L_4$ from each loudspeaker device 1, 2, 3, 4 to the listening point P and to take the propagation delay of the sound waves into account in order to maintain accuracy of the phase equalisation according to the invention These distances can according to an embodiment of the invention be measured and entered (manually or automatically) into a sound processing unit that implements the method of the invention during the system setup procedure.

Compensating for these differences in the distances between the individual loudspeaker devices and the listening point P will be generally important although especially important in the high end of the low frequency region.

In an embodiment of the invention, the processing delay (or the differences between the processing delays) in the individual loudspeaker devices can also be compensated by respective filter devices inserted in the signal paths leading to the respective loudspeaker devices.

Figure 7:
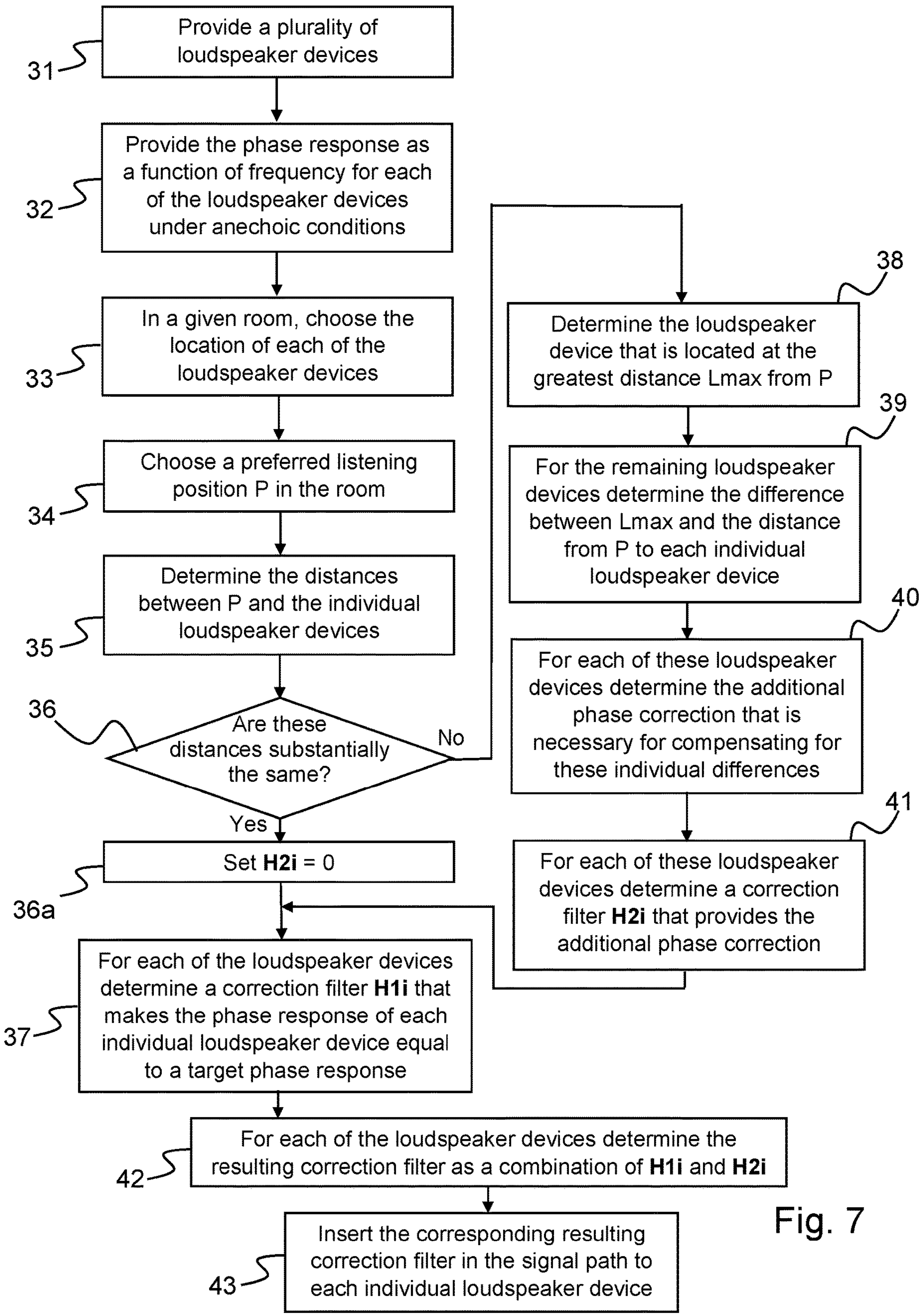
FIG. 7 shows a flow chart of an embodiment of the method according to the invention.

With reference to FIG. 7 there is shown a flow chart of an embodiment of the method according to the present invention, where the method starts at box 31 by providing the required number of loudspeaker devices to be used in a specific set-up in a room. It is however understood that even though the flow chart comprises a number of individual functional boxes 31 through 43 it may be advantageous in practical implementations of the method of the invention to combine some of the functions carried out in these boxes for instance in order to reduce the calculational requirements of algorithms that implement the method of the invention.

In box 32, the phase responses as a function of frequency obtained under anechoic conditions are provided for each individual loudspeaker device.

In box 33, the locations of each individual loudspeaker device in a specific room are chosen. According to the present invention there are no limitations to which locations within the room may be chosen (see for instance the set-up shown in FIG. 1*a*).

In box 34, a specific (preferred) listening position in the room is chosen. Again, according to the present invention, there are no limitations to which listening position within the room may be chosen (see for instance point P in the set-up shown in FIG. 1*a*).

In box 35, the distances between the listening point P and each individual loudspeaker device are determined.

If these distances are substantially equal, the method steps indicated in box 36*a*, 37, 42 and 43 are followed, whereas, if the distances are different, the method steps indicated in box 38, 39, 40, 41, 37, 42, 43 are followed. This decision point is indicated by box 36 in the flow chart. In a practical implementation, it must be defined what the term "substantially the same" means. One option is to define a threshold value of differences below which the differences are regarded as equal and above which they are regarded as different.

If it is determined that the distances between P and the individual loudspeakers are substantially equal, the correction filter H2*i* is made equal to zero for each individual loudspeaker device in box 36*a*. Then, the method continues to box 37, in which, for each individual of the loudspeaker devices there is determined a correction filter H1*i* (i designating the specific loudspeaker device) that makes the phase response of each individual loudspeaker device equal to a given (predefined) target phase response.

In the case where the distances between P and the individual loudspeaker devices are substantially equal, the resulting correction filters mentioned in box 42 are simply H1*i* and these resulting correction filters are in box 43 inserted in the signal path to each individual loudspeaker device. In this case, the correction filter H2*i* is made equal to zero for each individual loudspeaker device.

If the distances between P and each individual loudspeaker device are different, the method steps indicated in box 38, 39, 40, 41, 37, 42, 43 are followed.

In box 38, the loudspeaker device that is located at the greatest distance Lmax from the listening point P is determined. This is the loudspeaker device that does not require an additional phase correction H2*i* and is hence chosen as a reference loudspeaker device for determining the required additional phase corrections of the remaining loudspeaker devices.

In box 39, the differences between Lmax and the distances from the listening point P to the remaining loudspeaker devices are determined.

In box 40, the additional phase corrections that are required for compensating for the different distances from Lmax to the remaining loudspeaker devices are determined.

In box 41, there is for each of the remaining loudspeakers determined a correction filter H2*i* (i designating the specific loudspeaker device) that provides the additional phase correction that is necessary to compensate for the different distances between Lmax and the distance from P to each of the individual remaining loudspeaker devices.

Then, the method continues to box 37, in which the individual correction filters H1*i* are determined, as described above.

In box 42, for each of the loudspeaker devices a resulting phase correction filter is determined that is a combination of H1*i* and H2*i* and in box 43, these resulting compensation filters are inserted into the signal paths to the respective individual loudspeaker devices.

Figure 8:
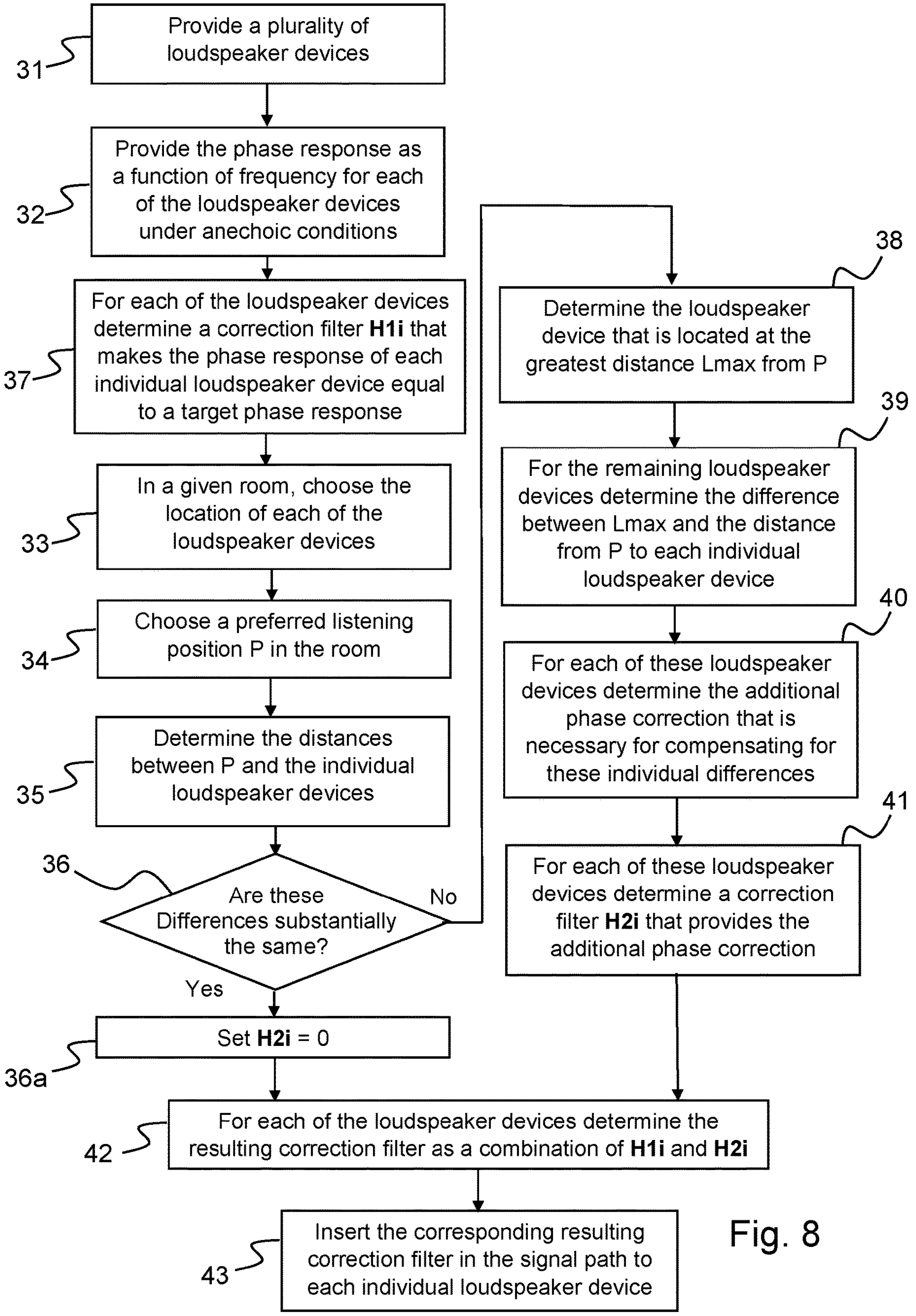
FIG. 8 shows a flow chart of an alternative embodiment of the method according to the invention.

With reference to FIG. 8 there is shown an alternative embodiment of the method according to the invention. The difference between the embodiments shown in FIGS. 7 and 8 is that in the embodiment shown in FIG. 8, box 37 in which the individual correction filters H1*i* are determined is provided between boxes 32 and 33. This means that if it is determined in box 36 that the differences are substantially the same, the method continues directly to box 42 in which the correction filters H1*i* and H2*i* are combined, H2*i* in this case having been made equal to zero in box 36*a*, i.e. no additional phase corrections due to differences between the individual distances are required.

It is understood that although the method of the invention has been described by the two alternative embodiments shown in FIGS. 7 and 8, respectively, wherein the embodiments comprise a number of separate functional boxes it may be possible to implement some of these functional boxes—and hence the corresponding method steps—differently, for instance by combining some of the functions of individual boxes or for some of the boxes to alter the order of the boxes in the flow charts.

The invention claimed is:

1. A method for managing low frequency content, the method comprising:

providing a plurality of loudspeaker devices of a loudspeaker system, wherein each of the plurality of loudspeaker devices has a known response as a function of frequency under anechoic conditions comprising a phase response;

during a set-up process of the loudspeaker system, automatically identify each of the plurality of loudspeaker devices from a list of supported loudspeakers from a database containing a frequency response (magnitude and phase response) obtained under anechoic conditions;

for each of the plurality of loudspeaker devices, providing from the database a corresponding phase response as a function of frequency obtained under anechoic conditions;

for each of the plurality of loudspeaker devices, inserting a filter device in a signal chain to a corresponding one of the plurality of loudspeaker devices, wherein the phase response of the respective filter device is based on the corresponding phase response as a function of frequency obtained under anechoic conditions, and where the respective filter device has such a phase response that the resulting phase response of each one of the plurality of loudspeaker devices under anechoic conditions plus the corresponding phase response of the respective filter is substantially identical for all of the plurality of loudspeaker devices;

determining distances from a given listening point to each of the plurality of loudspeaker devices;

if the plurality of loudspeaker devices are located at different distances from the given listening point, introducing an additional individual phase compensation in the respective signal chains to compensate for the different distances; and wherein the additional individual phase compensation is zero for one of the plurality of loudspeaker devices that is at a greatest distance from the given listening point, such that sound signals emitted by remaining ones of the plurality of loudspeaker devices are delayed corresponding to a difference between the greatest distance from the given listening point and respective distances between each of the remaining ones of the plurality of loudspeaker devices from the given listening point.

2. The method according to claim 1, wherein each filter device of a corresponding one of the plurality of loudspeaker devices is an all-pass filter.

3. The method according to claim 1, wherein each filter device of a corresponding one of the plurality of loudspeaker devices is an IIR filter.

4. The method according to claim 1, wherein each filter device of a corresponding one of the plurality of loudspeaker devices comprises a passband that is limited to a low-frequency region that is below 1000 Hz.

5. The method according to claim 1, comprising providing an additional database containing filter coefficients of filter parameters for each of the plurality of loudspeaker devices.

6. The method according to claim 5, wherein the additional database is accessible via the internet or other communication networks, which may be wired or wireless.

7. The method according to claim 1, wherein the database is accessible via the internet or other communication networks, which may be wired or wireless.

8. A loudspeaker system comprising:

a plurality of loudspeaker devices, wherein each of the plurality of loudspeaker devices has a known response as a function of frequency under anechoic conditions, comprising a phase response;

a sound processing unit configured to, during a set-up process of the loudspeaker system, automatically identify each of the plurality of loudspeaker devices from a list of supported loudspeakers from a database containing a frequency response (magnitude and phase response) obtained under anechoic conditions;

providing means configured to from the database and for each of the plurality of loudspeaker devices, providing the corresponding phase response as a function of frequency obtained under anechoic conditions;

for each of the plurality of loudspeaker devices, a filter device capable of providing phase compensation of an input signal for each of the plurality of loudspeaker devices and providing a filtered output signal either directly or via further signal processing means to a corresponding one of the plurality of loudspeaker devices;

means for providing information about the phase compensation of the input signal for each of the plurality of loudspeaker devices that is required in order to obtain a resulting phase response of each of the plurality of loudspeaker devices under anechoic conditions plus the corresponding phase response of the corresponding filter is substantially identical for all of the plurality of loudspeaker devices;

means for adjusting the phase response of each filter of the plurality of loudspeaker devices according to the information;

wherein each filter of the plurality of loudspeaker devices comprise a first filter unit configured to compensate for differences in phase response between the plurality of loudspeaker devices under anechoic conditions and a second filter unit configured to introduce an additional individual phase compensation to compensate for differences in respective distances between the plurality of loudspeaker devices and a given listening point; and wherein said additional individual phase compensation is zero for one of the plurality of loudspeaker devices that is at a greatest distance from the given listening point, such that sound signals emitted by remaining ones of the plurality of loudspeaker devices are delayed corresponding to the difference between the greatest distance from the given listening point and respective distances between each of the remaining ones of the plurality of loudspeaker devices from the given listening point.

9. The loudspeaker system according to claim 8, wherein the means for providing information about the phase compensation is additional database provided in the loudspeaker system.

10. The loudspeaker system according to claim 8, wherein the means for providing information about the phase compensation is one or more remotely located additional databases and wherein the loudspeaker system comprises communication means configured to obtain information about the phase compensation from the one or more remotely located databases.

11. The loudspeaker system according to claim 8, wherein each filter device of a corresponding one of the plurality of loudspeaker devices is an all-pass filter.

12. The loudspeaker system according to claim 8, wherein each filter device of a corresponding one of the plurality of loudspeaker devices is an IIR filter.

13. The loudspeaker system according to claim 8, wherein each filter device of a corresponding one of the plurality of loudspeaker devices comprises a passband that is limited to a low-frequency region that is below 1000 Hz.

* * * * *